(12) United States Patent
Bing et al.

(10) Patent No.: US 11,028,524 B2
(45) Date of Patent: Jun. 8, 2021

(54) POSITIVE-NEGATIVE-ROTATION FAN FOR CLOTHES DRYER, AND CLOTHES DRYER

(71) Applicant: QINGDAO HAIER WASHING MACHINE CO., LTD., Shandong (CN)

(72) Inventors: Jindong Bing, Shandong (CN); Rongfeng Cheng, Shandong (CN); Tao Li, Shandong (CN)

(73) Assignee: QINGDAO HAIER WASHING MACHINE CO., LTD., Shandong (CN)

( * ) Notice: Subject to any disclaimer, the term of this patent is extended or adjusted under 35 U.S.C. 154(b) by 154 days.

(21) Appl. No.: 16/336,359

(22) PCT Filed: Sep. 11, 2017

(86) PCT No.: PCT/CN2017/101260
§ 371 (c)(1),
(2) Date: Mar. 25, 2019

(87) PCT Pub. No.: WO2018/054238
PCT Pub. Date: Mar. 29, 2018

(65) Prior Publication Data
US 2019/0301079 A1    Oct. 3, 2019

(30) Foreign Application Priority Data

Sep. 26, 2016   (CN) .......................... 201610850688.1

(51) Int. Cl.
*D06F 58/30*    (2020.01)
*F04D 17/10*    (2006.01)
(Continued)

(52) U.S. Cl.
CPC .............. *D06F 58/30* (2020.02); *D06F 58/02* (2013.01); *D06F 58/20* (2013.01); *F04D 17/10* (2013.01);
(Continued)

(58) Field of Classification Search
CPC .......... F04D 17/04; F04D 29/26; F04D 29/28; F04D 29/281; F04D 29/282;
(Continued)

(56) References Cited

U.S. PATENT DOCUMENTS 4,419,049 A * 12/1983 Gerboth ................ F04D 29/403
                                                        415/119
5,399,068 A *  3/1995 Park .................... F04D 29/4226
                                                        415/204
(Continued)

FOREIGN PATENT DOCUMENTS

CN         2568855 Y     8/2003
CN       205101285 U     3/2016
(Continued)

OTHER PUBLICATIONS

International Search Report (PCT/ISA/210) and Written Opinion (PCT/ISA/237) dated Dec. 14, 2017, by the Chinese Patent Office as the International Searching Authority for International Application No. PCT/CN2017/101260.

*Primary Examiner* — Richard A Edgar
*Assistant Examiner* — Jackson N Gillenwaters
(74) *Attorney, Agent, or Firm* — Buchanan Ingersoll & Rooney PC

(57) ABSTRACT

A positive-negative-rotation fan for a clothes dryer comprises multiple whole-size fan blades arranged on a periphery of an outer frame of the fan, and multiple half-size fan blades arranged on the periphery of the outer frame of the fan. The half-size fan blades and the whole-size fan blades (Continued)

have similar shapes, and the size of an edge of each half-size fan blade parallel to a radial direction of the fan is half of the size of a corresponding edge of the whole-size fan blade. The clothes dryer using the positive-negative-rotation fan can provide an even and great air volume and a great air intake pressure in a clockwise and counterclockwise alternating rotation process, and accordingly clothes are evenly dried and the drying time is short. By using a flow guide device, aggregated back-flows are not generated between the fan and an outlet of a volute.

10 Claims, 4 Drawing Sheets

(51) Int. Cl.
| | |
|---|---|
| *F04D 29/22* | (2006.01) |
| *F04D 29/48* | (2006.01) |
| *F04D 29/30* | (2006.01) |
| *F04D 29/42* | (2006.01) |
| *D06F 58/20* | (2006.01) |
| *D06F 58/02* | (2006.01) |
| *F04D 29/28* | (2006.01) |
| *D06F 103/00* | (2020.01) |
| *D06F 103/34* | (2020.01) |
| *D06F 103/36* | (2020.01) |
| *D06F 103/44* | (2020.01) |
| *D06F 105/24* | (2020.01) |
| *D06F 105/46* | (2020.01) |

(52) U.S. Cl.
CPC ........... *F04D 29/22* (2013.01); *F04D 29/281* (2013.01); *F04D 29/30* (2013.01); *F04D 29/422* (2013.01); *F04D 29/483* (2013.01); *D06F 2103/00* (2020.02); *D06F 2103/34* (2020.02); *D06F 2103/36* (2020.02); *D06F 2103/44* (2020.02); *D06F 2105/24* (2020.02); *D06F 2105/46* (2020.02)

(58) Field of Classification Search
CPC .. F04D 29/4226; F04D 29/422; F04D 29/547; F04D 29/666; F05D 2250/75
See application file for complete search history.

(56) References Cited

U.S. PATENT DOCUMENTS

| | | | | |
|---|---|---|---|---|
| 5,655,874 | A * | 8/1997 | Subramanian | F04D 29/422 |
| | | | | 415/53.1 |
| 5,964,576 | A * | 10/1999 | Fujita | F04D 29/282 |
| | | | | 415/206 |
| 7,357,617 | B2 * | 4/2008 | Haga | F04D 17/04 |
| | | | | 415/99 |
| 7,597,541 | B2 * | 10/2009 | White | F04D 29/282 |
| | | | | 415/204 |
| 8,007,241 | B2 * | 8/2011 | Vadillo | F04D 29/281 |
| | | | | 416/203 |
| 10,539,150 | B2 * | 1/2020 | Ling | F04D 29/282 |
| 2003/0084682 | A1 * | 5/2003 | Choi | F04D 29/4226 |
| | | | | 62/426 |
| 2008/0107523 | A1 * | 5/2008 | Chen | F04D 29/663 |
| | | | | 415/206 |
| 2020/0062075 | A1 * | 2/2020 | Hirosue | F04D 17/04 |

FOREIGN PATENT DOCUMENTS

| | | | | |
|---|---|---|---|---|
| DE | 3830542 | A1 | 3/1990 | |
| JP | H1037893 | A | 2/1998 | |
| JP | 2007209419 | A | 8/2007 | |
| JP | 2010264306 | A | 11/2010 | |
| WO | WO-0047810 | A1 * | 8/2000 | ............ D06F 58/20 |

* cited by examiner

POSITIVE-NEGATIVE-ROTATION FAN FOR CLOTHES DRYER, AND CLOTHES DRYER

TECHNICAL FIELD

The present invention belongs to the technical field of clothes dryers, and particularly relates to a positive-negative-rotation fan for a clothes dryer, and the clothes dryer.

BACKGROUND

The basic operating principle of a clothes dryer is to heat up relatively dry air to make it carry moisture after being heated up. The hot dry air with high temperature is delivered by the fan to the drum where it is in contact with the wet clothes and heats up them so that the moisture in the wet clothes is separated out in the form of water vapor. And then the relatively hot dry air quickly absorbs the water vapor on the surface of the wet clothes and becomes the saturated moist air with medium-high temperature which is separated from the wet clothes through the operating of the fan, thereby achieving the purpose of drying, as shown in FIG. 1. In order to ensure that the clothes in the drum can be dried evenly, the drum for the clothes dryer can rotate clockwise or counterclockwise unidirectionally, or rotate in the clockwise and counterclockwise directions alternately and regularly around its axis to turn over the clothes. In this way, the clothes can be turned over effectively, so that the clothes can be dried evenly in a shorter time, thereby preventing the clothes from intertwining with each other and improving the user experience.

Therefore, the effective circulation of wind has a great impact on the operating efficiency of the clothes dryer, and the formation of the wind is achieved through the intake device. FIG. 2 shows that the intake device in the prior art comprises a volute 1 and a fan 2 arranged in the volute 1, a heating device 3 is installed at the outlet of the intake device. The main flow of the airflow in the intake device of the prior art always flows along the side wall in the rotation direction to the heating device 3, and may generate severe back-flows 4 in the opposite side, leading to a low use efficiency of the heating device 3. Moreover, it may cause local overheating of the heating device 3 and thus pose a safety hazard. The specific structure of the fan 2 adopted by the prior art is shown in FIG. 3. The whole-size fan blades 21 are disposed on the periphery of the fan 2. In order to avoid the occurrence of this hazard, temperature protection control on the heating device 3 can be implemented. When the temperature of the heating device 3 is higher than the preset safety temperature, the power supply of the heating wire will be cut off to stop heating, but it will reduce the efficiency of the clothes dryer, extend the drying time and affect the service life of electrical components if the dryer is powered on and off frequently.

In addition, the clothes dryer mentioned above has uneven air volume and low air pressure when it rotates in the clockwise and counterclockwise directions alternately, and cannot provide higher air volume, intake pressure and even air volume for the heating device 3 of the clothes dryer.

In view of this, the present invention is hereby presented.

SUMMARY

The primary object of the present invention is to provide a positive-negative-rotation fan for a clothes dryer, and the positive-negative-rotation fan for the clothes dryer can maintain a continuous wind circulation with even air volume and great flow pressure when it rotates in the clockwise and counterclockwise directions alternately, thereby improving the utilization efficiency of the heating device, eliminating potential safety hazards caused by a local high temperature of the heating device, significantly increasing the drying efficiency of the clothes dryer provided with the positive-negative-rotation fan for a clothes dryer while reducing energy consumption.

To solve the technical problem mentioned above, the present invention provides the following basic conception of its technical solution.

A positive-negative-rotation fan for a clothes dryer, comprising multiple whole-size fan blades arranged on a periphery of an outer frame of the fan, and multiple half-size fan blades arranged on the periphery of the outer frame of the fan.

The half-size fan blades and the whole-size fan blades have similar shapes, and the size of an edge of each half-size fan blade parallel to a radial direction of the fan is half of the size of a corresponding edge of the whole-size fan blade.

Preferably, the shape of the whole-size fan blades or the half-size fan blades is similar to a right trapezoid. A height side of the shape similar to the right trapezoid is arranged on the outer frame of the fan and is perpendicular to the undersurface of the outer frame of the fan. A top base or a bottom base is connected with a lateral side of the shape similar to the right trapezoid in a manner of round corner.

Preferably, the shape of the whole-size fan blades or the half-size fan blades is a rhombus or other quadrangle.

According to the operating principle of the clothes dryer, whether a fan of the clothes dryer can provide even and continuous strong wind or not has a huge impact on the drying effect of the clothes dryer. In the prior art, it is hard for the fan of the clothes dryer to maintain a continuous wind circulation with even air volume while the drum is rotating, and the flow pressure of the fan is relatively small, leading to a relatively low efficiency in drying clothes, and causing higher energy consumption.

In order to increase the flow pressure of the fan, it is a common method in the prior art to increase the number of fan blades while keeping the parameters such as diameter constant, but this kind of improvement method is limited in the aspect of increasing the number of fan blades. What's more, when there are enough fan blades, the flow pressure of the fan blades will not be increased, and the air intake volume between two fan blades will also be affected because there is a certain thickness of the flow boundary layer. Consequently, the working efficiency of the fan blades is reduced, and no expected beneficial effects will be achieved, which means that the improvement method mentioned above is very limited.

The design of half-size fan blades adopted by the present invention ensures the air intake size among the blades, effectively reduces the occurrence of turbulence, avoids the phenomenon of restrike, and reduces the pressure fluctuation, thereby lowering the aerodynamic noise caused by the pressure fluctuation. On the other hand, the wind flows smoothly due to the reduction of the occurrence of turbulence, thus significantly improving the efficiency of the fan, effectively reducing the energy consumption and saving power resources.

The technical solution of the present invention adds half-size fan blades on the basis of the clothes dryer fan in the prior art. By doing so, it makes full use of the existing space of the fan frame, greatly reduces the occurrence of wind flow separation and restrike phenomenon, increases the flow pressure, significantly improves the operating efficiency of the fan, and overcomes the following technical problems caused by merely adding whole-size fan blades: a large space is taken up, the number of fan blades added is limited, and the air volume and air pressure of the fan cannot be increased effectively. In addition, it can significantly reduce the aerodynamic noise generated by the operating of the fan, reduce the physical and mental impact of noise pollution on users, and improve user experience.

Preferably, the number of the half-size fan blades is equal to that of the whole-size fan blades, and the half-size fan blades and the whole-size fan blades are arranged alternately in turn and evenly on the periphery of the fan. This setting of the half-size fan blades and the whole-size fan blades can ensure that the air volumes generated by the fan are more evenly, and guarantee that the air volumes in the drum of the clothes dryer are even during the process of drying clothes so that the drying degree of the clothes in the drum is more even and reliable, thus avoiding the problem caused by uneven wind that some clothes are not fully dried while the other clothes are over-dried. Moreover, this design makes the fan look very beautiful and complies with the aesthetic standards of symmetry.

Preferably, the distance between the half-size fan blade and the whole-size fan blade adjacent is in a range of 5~60 mm. Such a design of the distance between the half-size fan blade and the whole-size fan blade adjacent can increase the air volume and flow pressure of the fan, and further reduce the aerodynamic noise caused by pressure fluctuation.

More preferably, the distance between the half-size fan blade and the whole-size fan blade adjacent is in a range of 10~50 mm, and this distance can obtain relatively better beneficial effect compared with the distance between the half-size fan blade and the whole-size fan blade adjacent mentioned above, is more in line with the requirements on fans of clothes dryers with a large market demand, and has a better market prospect.

Another important object of the present invention is to provide a clothes dryer comprising a draught fan composed of the above positive-negative-rotation fan for a clothes dryer and a volute.

The clothes dryer mentioned above comprises the draught fan composed of the positive-negative-rotation fan for the clothes dryer and the volute. Just as in the conventional design of the prior art, a heating device is installed at an outlet of the draught fan.

The clothes dryer has the positive-negative-rotation fan for the clothes dryer, so there is a continuous, even circulation of wind with large flow pressure in the process of drying clothes, which makes the drying of clothes more efficient and more even. And because the fan works efficiently, the clothes dryer has less energy consumption.

Preferably, a chamber of the volute is of a symmetrical structure. The fan is located in the chamber of the volute and a center of the fan is located on a symmetry axis of the chamber of the volute. A flow guide device is arranged on one side of the fan towards the outlet of the volute, and a clearance is arranged between the flow guide device and a periphery of the fan. Moreover, the flow guide device is symmetrical in structure and its center is set on the symmetry axis of the chamber of the volute.

More preferably, the volute and the fan are in concentric symmetry or eccentric involute.

Preferably, the flow guide device is of a shape similar to an isosceles triangle. The base of the shape similar to the isosceles triangle is a concave circular arc and is close to one side of the periphery of the fan. A vertex angle of the shape similar to the isosceles triangle has an arc surface and faces the outlet of the volute. And both sides of the shape similar to the isosceles triangle are connected with the base with the concave circular arc with round corners.

Preferably, the flow guide device is of an inverted T shape, including a bottom plate and a vertical part connected with the bottom plate and located in the middle of the bottom plate. A base surface of the bottom plate is toward the fan. A free end of the vertical part is away from the bottom plate and toward the outlet of the volute, and the vertical part is perpendicular to the base surface of the bottom plate. The base surface of the inverted T-shaped flow guide device is an arc surface which extends along the periphery of the fan.

More preferably, the angle between the sides of the flow guide device in the shape similar to the isosceles triangle and the symmetry axis of the chamber of volute is in a range of 15~45°. The distance between the center of the fan and a vertex point of the shape similar to the isosceles triangle is in a range of 200 mm to 300 mm. The radius of the round corners connected between the sides of the shape similar to the isosceles triangle and the concave circular arc base is in a range of 3~12 mm. And the concave circular arc base of the shape similar to the isosceles triangle and an outer edge of the fan are set concentrically and have a separation distance of in a range of 3~12 mm. This flow guide device can further improve the initial velocity of the wind, reduce the back-flows in the flow path, and obtain greater intake pressure.

According to the preferred or more preferred technical solution as mentioned above, the main flow of the airflow generated by the fan flows to the heating device along one side of the flow guide device and one side wall of the volute towards it, and covers most of the area or the whole area of the heating device. And only a little amount of airflow turns back to the direction of the fan after it flows onto the other side wall of the volute. With the flow guide device, this amount of airflow can rejoin in the rotation of the fan under the guidance of the other side wall of the volute and the flow guide device without generating aggregated back-flows between the fan and the outlet of the volute. Therefore, the aforesaid clothes dryer can further improve the flow and pressure of the fan, and to better improve the efficiency of the draught fan. And the optimized or more optimized flow guide device can well or better improve the problem of the uneven temperature distribution of the heating device, enhance the use efficiency of the heating device, eliminate the potential safety hazard of local high temperature of the heating device so that the heating device can heat continuously without powering on and off frequently, thereby improving the drying efficiency, shortening the drying time and extending the service life of the electrical components.

The following is a further detailed description of the specific embodiment of the invention combined with the attached drawings.

Reference signs in figures: 1—volute, 2—fan, 21—whole-size fan blades, 22—half-size fan blades, 3—heating device, 4—back-flow, 5—flow guide device, a—hot dry air with high temperature, b—drum, c—saturated moist air with medium-high temperature.

DETAILED DESCRIPTION

Embodiment 1

Figure 4:
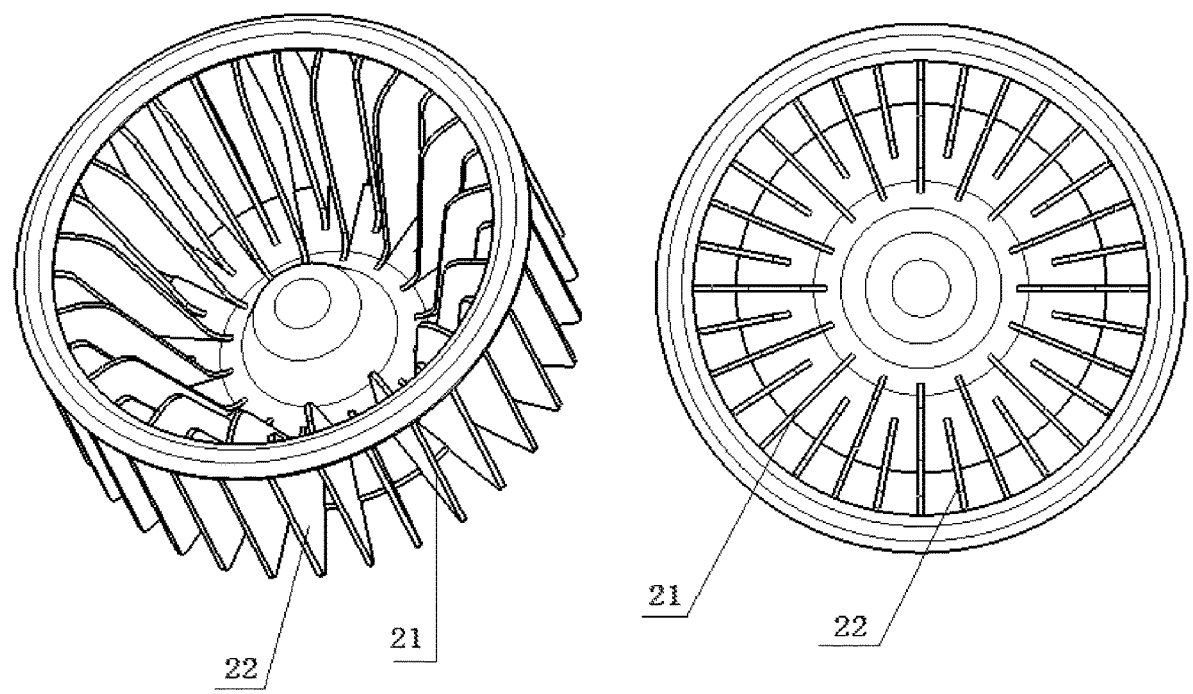
FIG. 4 shows a structural schematic diagram of a positive-negative-rotation fan for a clothes dryer in the present invention.

Referring to FIG. 4, the technical solution of the present invention discloses a positive-negative-rotation fan 2 for a clothes dryer, comprising multiple whole-size fan blades 21 and multiple half-size fan blades 22 arranged on the periphery of an outer frame of the fan.

The half-size fan blades 22 and the whole-size fan blades 21 have similar shapes. The size of an edge of each half-size fan blade 22 parallel to a radial direction of the fan 2 is half of the size of a corresponding edge of the whole-size fan blade 21. Intuitively, the portion of the half-size fan blades 22 facing the center of the fan 2 is half of the portion of the whole-size fan blades 21 facing the center of the fan 2.

The shape of the whole-size fan blades 21 or the half-size fan blades 22 is similar to a right trapezoid. The height side of the shape similar to a right trapezoid is arranged on the outer frame of the fan 2 and is perpendicular to the undersurface of the outer frame of the fan 2, and the top base or bottom base is connected with the lateral side of the shape similar to a right trapezoid by a round corner.

In fact, in other Embodiments, the shape of the whole-size fan blades or the half-size fan blades can further be set to a rhombus or other quadrangle.

In order to increase the flow pressure of the fan 2, it is a common method in the prior art to increase the number of fan blades while keeping the parameters such as diameter constant. However, when there are enough fan blades, this improvement method is limited in terms that the flow pressure of the fan 2 will not be increased, and the air intake volume between two fan blades will also be affected because there is a certain thickness of the flow boundary layer. Consequently, the working efficiency of the fan 2 is reduced, and no expected beneficial effects will be achieved.

The technical solution of the present invention overcomes the aforesaid defect, and the design of the half-size fan blades 22 ensures the air intake size among the blades, effectively reduces the occurrence of turbulence, avoids the phenomenon of restrike, and reduces the pressure fluctuation, thereby lowering the aerodynamic noise caused by the pressure fluctuation. On the other hand, the wind flows smoothly due to the reduction of the occurrence of turbulence, thus significantly improving the efficiency of the fan, effectively reducing the energy consumption and saving power resources.

Those skilled in the art should understand that the number of the half-size fan blades 22 and the whole-size fan blades 21 can be adjusted within a certain range according to the model and size of the clothes dryer and the fan in order to achieve expected effect, such as the suitable air volume and flow pressure of the fan.

Preferably, the number of the half-size fan blades 22 is equal to that of the whole-size fan blades 21, and the half-size fan blades 22 and the whole-size fan blades 21 are arranged alternately in turn and evenly on the periphery of the fan 2. This setting of the half-size fan blades 22 and the whole-size fan blades 21 can ensure that the air volumes generated by the fan 2 are more evenly, and guarantee that the air volumes in the drum of the clothes dryer are even during the process of drying clothes so that the drying degree of the clothes in the drum is more even and reliable, thus avoiding the problem caused by uneven wind that some clothes are not fully dried while the other clothes are over-dried.

Considering the needs of a variety of different models of clothes dryers, the present invention makes researches in the influence of the distance between the half-size fan blades 22 and the whole-size fan blades 21 adjacent on the factors such as air volume and the flow pressure of the fan in order to better improve the operating condition of the fan, to enhance as much as possible the working efficiency of the fan 2 and reduce energy consumption under the condition that the air volume of the fan 2 is even and continuous and the wind pressure is relatively large, and to reduce the aerodynamic noise caused when the fan 2 is operating. After a large number of researches and tests, it is concluded that when the distance between the half-size fan blades 22 and the whole-size fan blades 21 adjacent is in a range of 5~60 mm, the operating effect of the fan 2 is better.

More preferably, the distance between the half-size fan blades 22 and the whole-size fan blades 21 adjacent is in a range of 10~50 mm, and this distance can obtain a relatively better beneficial effect, is more in line with the requirements on fans of clothes dryers with a large market demand, and market prospect is better.

Figure 1:
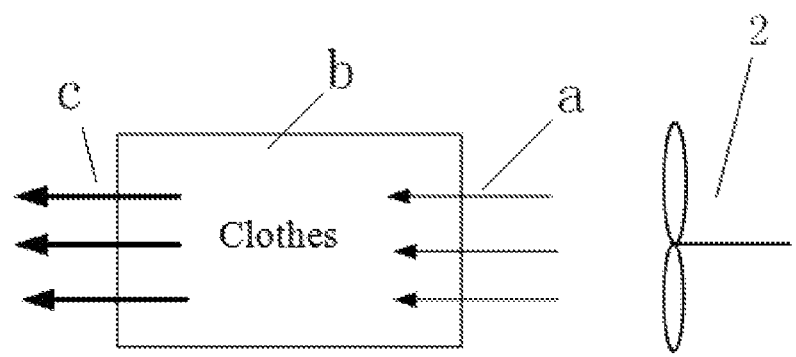
FIG. 1 shows a schematic diagram of the operating process principle of a clothes dryer.
Figure 2:
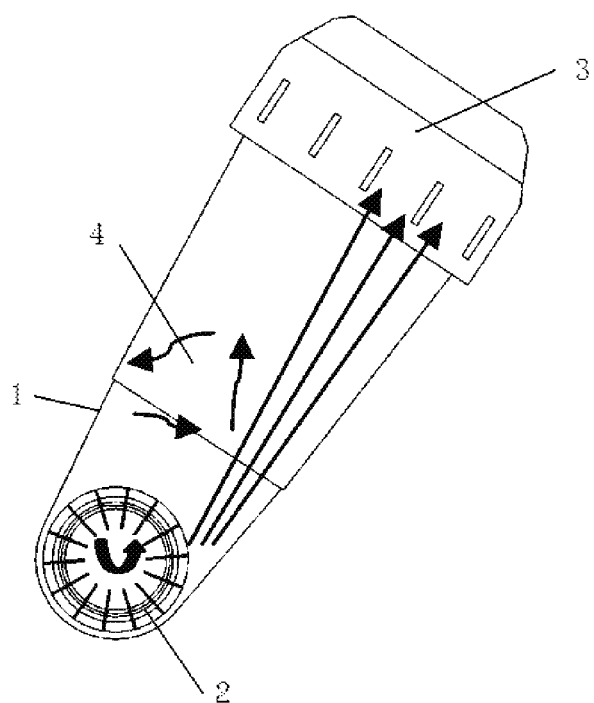
FIG. 2 shows a schematic diagram of an intake device of a clothes dryer in the prior art.
Figure 3:
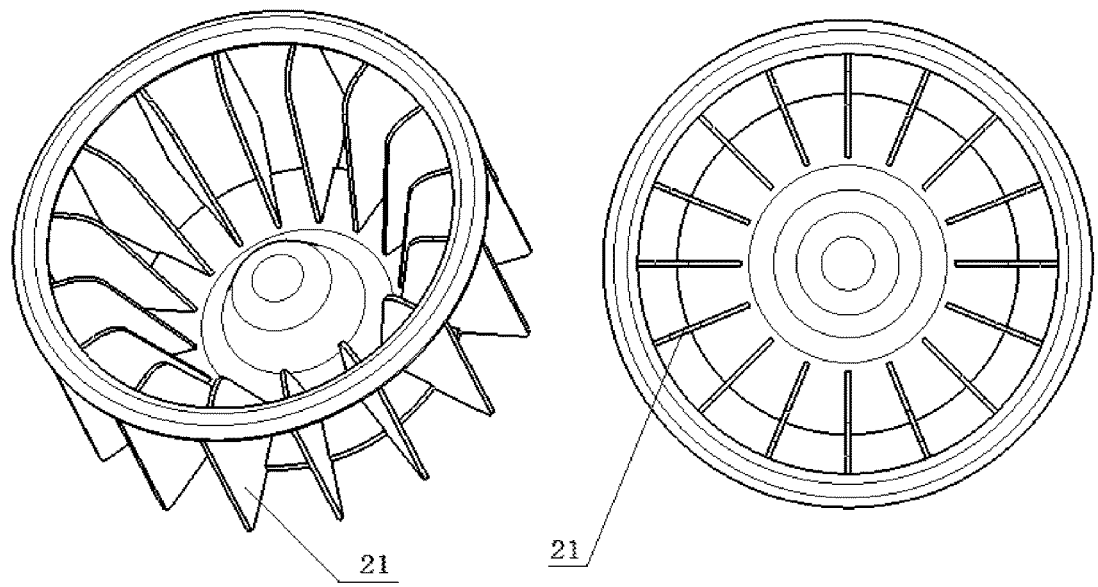
FIG. 3 shows a schematic structural diagram of a fan of the clothes dryer in the prior art.
Figure 6:
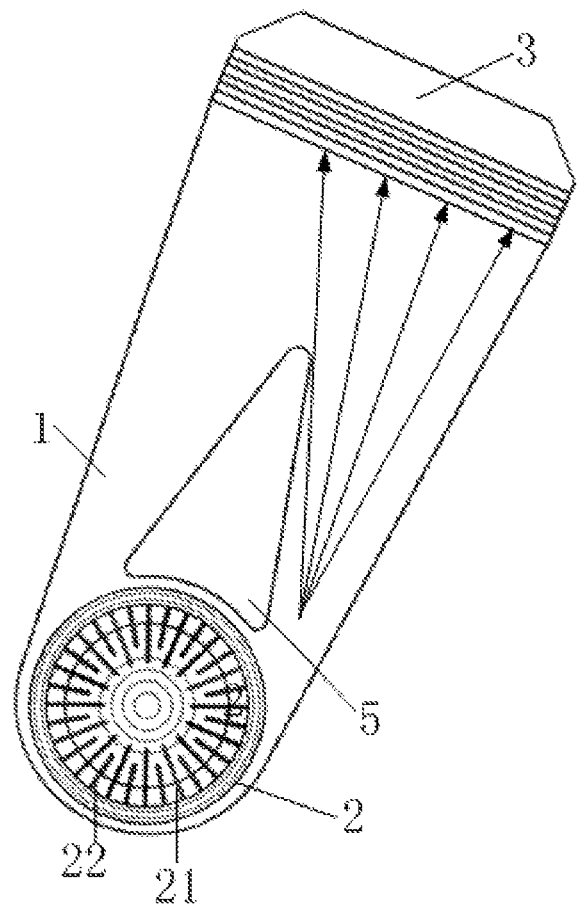
FIG. 6 shows a structural schematic diagram of a draught fan in the embodiments of the present invention.

Referring to FIG. 2 or FIG. 6, a draught fan is formed by assembling the positive-negative-rotation fan 2 for a clothes dryer and a volute 1, and at the outlet of the draught fan is installed a heating device 3 which is the core part for generating the hot air that the clothes dryer needs to dry clothes.

A new type of clothes dryer can be obtained by assembling the core part mentioned above with other conventional parts of the clothes dryer.

The clothes dryer has the following advantages as it includes the fan 2 of the present invention. It can achieve an even, continuous circulation of wind. Moreover, the flow pressure of the fan 2 is large, which can dry the clothes efficiently, the energy consumption is higher. The fan 2 of the clothes dryer ensures the air intake size among the fan blades, effectively reduces the occurrence of turbulence, avoids the phenomenon of restrike, and reduces the pressure fluctuation, thereby lowering the aerodynamic noise caused by the pressure fluctuation during the operating process of the clothes dryer, and improving user experience.

Preferably, the chamber of the volute 1 is symmetrical in structure. The fan 2 is located in the chamber of the volute 1 and the center of the fan 2 is located on the symmetry axis of the chamber of the volute 1. A flow guide device 5 is arranged on one side of the fan 2 towards the outlet of the volute 1, and has a clearance with the periphery of the fan 2. Moreover, the flow guide device 5 is symmetrical in structure and the center of the guide device 5 is set on the symmetry axis of the chamber of the volute 1.

In the aforesaid design, the main flow of the airflow generated by the fan 2 flows to the heating device 3 along one side of the flow guide device 5 and one side wall of the volute 1 towards it, and covers most of the area or the whole area of the heating device 3. Only a little amount of airflow turns back to the direction of the fan 2 after it flows onto the other side wall of the volute 1. Thus the amount of back-flow generated is small, improving the operating efficiency of the fan 2. With the flow guide device 5, this amount of airflow can rejoin in the rotation of the fan 2 under the guidance of the other side wall of the volute 1 and the flow guide device 5 without generating aggregated back-flows between the fan 2 and the outlet of the volute 1. Therefore, it overcomes the easily appeared problem of the uneven temperature distribution of the heating device of the draught fan of the clothes dryer in the prior art, enhances the use efficiency of the heating device 3, and eliminates the potential safety hazard of local high temperature of the heating device 3.

The matching settings of the fan 2 and the volute 1 can be performed in the following manner.

Figure 7:
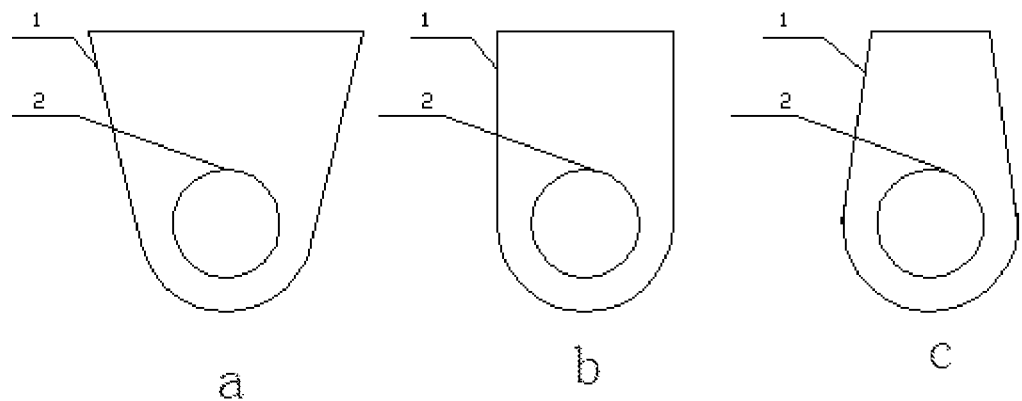
FIG. 7 shows a schematic diagram of three matching settings of the concentric symmetry of a fan and a volute.

As shown in the three drawings in FIG. 7, the fan 2 and the volute 1 are symmetrically arranged in a concentric manner. The longitudinal section of the volute 1 comprises a circular contour with an opening. Each side of the opening is outwards provided with a straight board. The two straight boards are separately tangential to the circular contour on both sides of the opening to form a U-shaped contour. The area between the two straight boards is communicated with the opening to form the outlet of the volute 1. The fan 2 is located in the circular contour and the center of the fan 2 is located in the center of the circular contour.

The difference between a, b and c in FIG. 7 is that the angle between the two straight boards is different.

Figure 8:
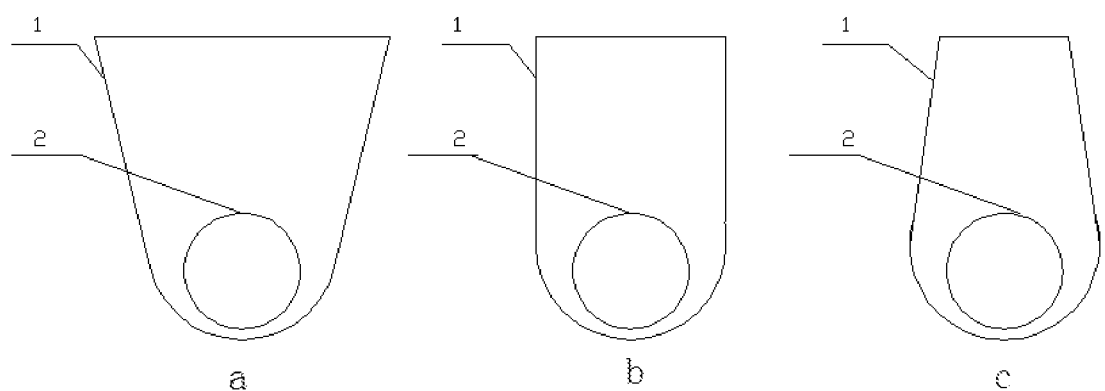
FIG. 8 shows a schematic diagram of three matching settings of the eccentric involute of a fan and a volute.

As shown in the three drawings in FIG. 8, the longitudinal section of the volute 1 comprises a shape similar to a circular contour formed by connecting several sections of involute contours. An opening is formed in this shape similar to the circular contour. A straight board is outwards arranged on each side of the opening, and the two straight boards are separately tangential to the shape similar to the circular contour on both sides of the opening to form a U-shaped contour. The area between the two straight boards is communicated with the opening to form the outlet of the volute 1. The fan 2 is located in the shape similar to the circular contour and the center axis of the fan 2 is located in one side of the center of the shape similar to a circular contour away from the outlet. That is, the clearance between the volute 1 and the fan 2 gradually increases from the bottom of the U-shaped contour to the outlet, which can form better wind pressure and improve the circulation amount of air flow.

The difference between a, b and c in FIG. 8 is that the angle between the two straight boards is different.

The various matching conditions shown in FIG. 7 and FIG. 8 can all realize that the draught fan of the clothes dryer can effectively output air flow of the same pressure and air volume when the fan rotates in clockwise and counterclockwise directions alternately and regularly.

Figure 5:
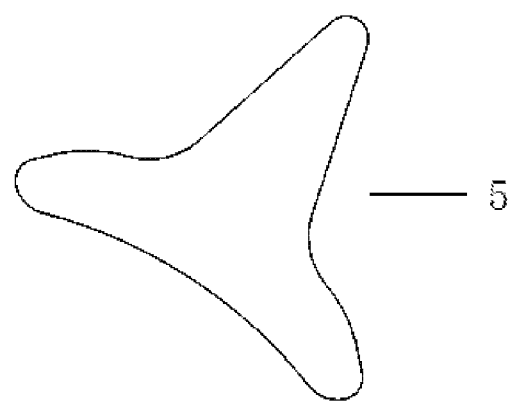
FIG. 5 shows a structural schematic diagram of a flow guide device in the present invention.

Preferably, referring to FIG. 5, the flow guide device 5 is of an inverted T shape, including a bottom plate and a vertical part connected with the bottom plate and located in the middle of the bottom plate. The base surface of the bottom plate is toward the fan 2. A free end of the vertical part is away from the bottom plate and toward the outlet of the volute 1, and the vertical part is perpendicular to the base surface of the bottom plate. The base surface of the inverted T-shaped flow guide device 5 is an arc surface which extends along the periphery of the fan.

The flow guide device 5 can make the airflow generated by the rotation of the fan 2 flow out between the side walls of the volute 1 and the fan 2. The airflow in the volute 1 flows smoothly without generating vibration, and aerodynamic noise is reduced.

The fan 2 of the clothes dryer can still maintain continuous and even wind with significantly increased flow and pressure in the process of rotating in clockwise or counterclockwise directions alternately, which greatly improves the drying efficiency of the clothes dryer. The flow guide device 5 can better improve the problem of the uneven temperature distribution of the heating device 3, enhance the use efficiency of the heating device 3, eliminate the potential safety hazard of local high temperature of the heating device 3 so that the heating device 3 can heat continuously without powering on and off frequently, thereby improving the drying efficiency, shortening the drying time and extending the service life of the electrical components.

Embodiment 2

The key difference between Embodiment 2 and Embodiment 1 is that the shape and structure of the flow guide device 5 adopted are different.

Referring to FIG. 5, the flow guide device 5 is of a shape similar to an isosceles triangle. The base of the shape similar to the isosceles triangle is of a concave circular arc and is close to one side of the periphery of the fan 2. The vertex angle of the shape similar to the isosceles triangle has an arc surface and faces the outlet of the volute 1. Both sides of the shape similar to the isosceles triangle are connected with the base with the concave circular arc in a manner of round corners.

Preferably, the angle between the side of the flow guide device 5 in the shape similar to the isosceles triangle and the symmetry axis of the chamber of volute is 15~45°. The distance between the center of the fan 2 and the vertex point of the shape similar to the isosceles triangle is in a range of 200 mm to 300 mm. The radius of the round corners connected between the side of the shape similar to the isosceles triangle and the concave circular arc base is in a range of 3~12 mm. The concave circular arc base of the shape similar to the isosceles triangle and the outer edge of the fan are set concentrically and have a separation distance of 3~12 mm. The relevant parameter settings of the flow guide device 5 are in line with the setting of various types of clothes dryers with a large market demand so as to achieve the effects of improving the initial velocity of the wind, reducing the back-flows, and obtaining greater intake pressure.

The matching settings of the fan 2 and the volute 1 can be performed in the following manner.

As shown in the three drawings in FIG. 7, the fan 2 and the volute 1 are symmetrically arranged in a concentric manner. The longitudinal section of the volute 1 comprises a circular contour with an opening. A straight board is outwards arranged on each side of the opening. The two straight boards are separately tangential to the circular contour on both sides of the opening to form a U-shaped contour. The area between the two straight boards are communicated with the opening to form the outlet of the volute 1, and the fan 2 is located in the circular contour and the center of the fan 2 is located in the center of the circular contour.

The difference between a, b and c in FIG. 7 is that the angle between the two straight boards is different.

As shown in the three drawings in FIG. 8, the longitudinal section of the volute 1 comprises a shape similar to a circular contour formed by connecting several sections of involute contours, and an opening is formed in this shape similar to the circular contour. A straight board is outwards arranged on each side of the opening, and the two straight boards are separately tangential to the shape similar to the circular contour on both sides of the opening to form a U-shaped contour. The area between the two straight boards is communicated with the opening to form the outlet of the volute 1. The fan 2 is located in the shape similar to the circular contour and the center axis of the fan 2 is located in the one side of the center of the shape similar to the circular contour away from the outlet. That is, the clearance between the volute 1 and the fan 2 gradually increases from the bottom of the U-shaped contour to the outlet, which can form better wind pressure and improve the circulation of air flow.

The difference between a, b and c in FIG. 8 is that the angle between the two straight boards is different.

The various matching conditions shown in FIG. 7 and FIG. 8 can all realize that the draught fan of the clothes dryer can effectively output air flow of the same pressure and air volume when the fan 2 rotates in clockwise and counter-clockwise directions alternately and regularly.

The fan 2 of the clothes dryer can still maintain continuous and even wind with significantly increased flow and pressure in the process of rotating in clockwise or counter-clockwise directions alternately, which greatly improves the drying efficiency of the clothes dryer. The flow guide device 5 can better improve the problem of the uneven temperature distribution of the heating device 3, enhance the use efficiency of the heating device 3, and eliminate the potential safety hazard of local high temperature of the heating device 3 so that the heating device 3 can heat continuously without powering on and off frequently, thereby improving the drying efficiency, shortening the drying time and extending the service life of the electrical components.

In addition, the clothes dryers with the aforesaid flow guide device 5 can further improve the initial velocity of the wind, reduce the back-flows in the flow path, obtain greater intake pressure, and make the air distribution more even when passing through the heating device 3 so as to improve the working efficiency of the heating device 3, speed up the drying speed of the clothes dryer, shorten the time and reduce the power consumption.

The invention claimed is:

1. A clothes dryer, comprising:
a positive-negative rotation fan including multiple first fan blades arranged on a periphery of an outer frame of the fan, multiple second fan blades arranged on the periphery of the outer frame of the fan;
a volute, wherein a chamber of the volute is of a symmetrical structure, the fan is located in the chamber of the volute and a center of the fan is located on a symmetry axis of the chamber of the volute; and
a flow guide device arranged on one side of the fan towards an outlet of the volute, and a clearance is formed between the flow guide device and a periphery of the fan, wherein
the flow guide device is symmetrical in structure and a center of the flow guide device is set on the symmetry axis of the chamber of the volute,
the flow guide device is of an inverted T shape, and includes a bottom plate and a vertical part connected with the bottom plate and located in a middle of the bottom plate,
wherein a base surface of the bottom plate is toward the fan, a free end of the vertical part is away from the bottom plate and toward the outlet of the volute, the vertical part is perpendicular to the base surface of the bottom plate, and the base surface of the inverted T-shaped flow guide device is an arc surface which extends along the periphery of the fan.

2. The clothes dryer according to claim 1, wherein the number of the second fan blades is equal to that of the first fan blades, and the second fan blades and the first fan blades are arranged alternately and evenly on the periphery of the fan.

3. The clothes dryer according to claim 2, wherein a distance between the second fan blade and the first fan blade adjacent is 5~60 mm.

4. The clothes dryer according to claim 1, wherein a distance between the second fan blade and the first fan blade adjacent is 5~60 mm.

5. The clothes dryer according to claim 4, wherein the distance between the second fan blade and the first fan blade adjacent is 10~50 mm.

6. The clothes dryer according to claim 1, wherein the volute and the fan are in concentric symmetry; or the volute is of an involute structure, the involute structure and the fan have different centers.

7. The clothes dryer according to claim 6, wherein the flow guide device is of a shape similar to an isosceles triangle; a base of the shape similar to the isosceles triangle is a concave circular arc and is close to one side of the periphery of the fan; a vertex angle of the shape similar to the isosceles triangle has an arc surface and faces the outlet of the volute; and both sides of the shape similar to the isosceles triangle are connected with the base with the concave circular arc in a manner of round corners.

8. The clothes dryer according to claim 1, wherein the flow guide device is of a shape similar to an isosceles triangle; a base of the shape similar to the isosceles triangle is a concave circular arc and is close to one side of the periphery of the fan; a vertex angle of the shape similar to the isosceles triangle has an arc surface and faces the outlet of the volute; and both sides of the shape similar to the isosceles triangle are connected with the base with the concave circular arc in a manner of round corners.

9. The clothes dryer according to claim 8, wherein the angle between the sides of the flow guide device in the shape similar to the isosceles triangle and the symmetry axis of the chamber of the volute is in a range of 15~45°; the distance between the center of the fan and a vertex point of the shape similar to the isosceles triangle is in a range of 200 mm to 300 mm; radius of the round corners connected between the sides of the shape similar to the isosceles triangle and the concave circular arc base is in a range of 3~12 mm; and the base with the concave circular arc of the shape similar to the isosceles triangle and an outer edge of the fan are set concentrically and have a separation distance of 3~12 mm.

10. The clothes dryer according to claim 1, wherein the volute comprises a shape similar to a circular contour formed by connecting several sections of involute contours, the shape similar to the circular contour and the fan have different centers.

* * * * *